United States Patent [19]

Ohtake

[11] Patent Number: 5,519,468
[45] Date of Patent: May 21, 1996

[54] PHOTOGRAPHIC CAMERA PROVIDED WITH AUTOMATIC PREPARATION FOR PHOTOGRAPHING

[75] Inventor: Katsuhiro Ohtake, Ohmiya, Japan

[73] Assignee: Fuji Photo Optical Co., Ltd., Japan

[21] Appl. No.: 325,667

[22] Filed: Oct. 18, 1994

[30] Foreign Application Priority Data

Oct. 19, 1993 [JP] Japan .................... 5-283934

[51] Int. Cl.⁶ ........................... G03B 7/26
[52] U.S. Cl. ........................... 354/484
[58] Field of Search ................... 354/484, 409

[56] References Cited

U.S. PATENT DOCUMENTS

| | | | |
|---|---|---|---|
| 4,142,788 | 3/1979 | Matsumoto et al. | 354/409 X |
| 4,328,456 | 5/1982 | Suzuki et al. | 354/484 X |
| 4,429,974 | 2/1984 | Suzuki | 354/484 |
| 5,053,804 | 10/1991 | Odaka et al. | 354/484 |
| 5,376,985 | 12/1994 | Saito et al. | 354/289.12 |

*Primary Examiner*—W. B. Perkey
*Attorney, Agent, or Firm*—Price, Heneveld, Cooper, DeWitt & Litton

[57] ABSTRACT

A photographic camera is provided with an automatic preparation function including a built-in microcontroller and a solar cell provided on an outer surface of the camera, wherein an electromotive force generated by the solar cell energizes the microcontroller and thereby makes the camera ready for photographing and wherein, if no electromotive force is generated by the solar cell within a predetermined period, the microcontroller is de-energized and the camera is made not ready for photographing. The microcontroller is automatically energized to make the camera ready for photographing as the solar cell generates an electromotive force, so the camera can be made ready for photographing without any manual operation of the main switch control element by the user and the possibility that a photographing opportunity may be missed can be minimized. No electromotive force is generated by the solar cell so far as the camera remains stored away in the camera case or laid in the dark. In this state, therefore, the microcontroller is not energized, the main switch is turned OFF and, thus, the camera is made not ready for photographing. As a consequence, the main capacitor in the strobe circuit is not further charged and the automatic exposure metering function also is no longer actuated. Consumption of the built-in source battery is thereby minimized.

30 Claims, 3 Drawing Sheets

PHOTOGRAPHIC CAMERA PROVIDED WITH AUTOMATIC PREPARATION FOR PHOTOGRAPHING

BACKGROUND OF THE INVENTION

1. Technical Field

The present invention relates to a photographic camera provided with an automatic preparation function allowing the camera to be made ready for photographing without any manual operation of control elements, such as a control element that is operatively associated with a main switch.

2. Prior Art

Recently, photographic cameras, which are provided with various functions, such as an automatic exposure metering function, an autofocusing function, a low luminance responsive automatic discharge function for built-in strobe, and an automatic film transport function, have achieved general use. These cameras allow even inexperienced users to enjoy photography. Such cameras provided with these various automatic functions allow the user to release the shutter immediately after the camera has been directed at the object to be photographed without concern for the luminance of the object. In this manner, well-focused pictures may be obtained without apprehension about various errors that may occur, such as multiple exposure and the like. As a result, it is easy for even users who are inexperienced in the operation of a camera to take high quality snapshots; for example, of scenery and persons.

With such conventional camera provided with various automatic functions, the user removes the camera from the camera case and operates a control element associated with the main switch in order to prepare the camera for photographing. When the main switch is turned ON by operating this control element, a built-in microcontroller is energized to open the protective barrier for the objective and simultaneously to extend the objective forward from its retracted position to its position ready for photographing. With the camera directed at the object captured in the viewfinder and upon partial depression of the release button, the automatic exposure (AE) sensor determines a luminance of the object and thereby automatically determines an exposure time while the automatic focus (AF) sensor detects a distance to the object in order to focus the objective on the object to be photographed. Upon complete depression of the release button, the shutter is released. Upon completion of the shutter release, the film roll is transported by one frame and the next frame is aligned with the aperture. If the luminance of the object is determined to be insufficient by the microcontroller, the built-in strobe is automatically discharged in operative association with the shutter release.

When the camera is prepared for photographing, various camera information, such as the number of frames left to be used (or the number of frames already used), the able or disable status of the strobe flash, the photographing mode selected (for example, panoramic photographing mode), and a lack of capacity of the source battery, is displayed on a display conveniently positioned on the camera body.

To place the camera in an inoperative mode, the main switch control element is operated to turn the main switch OFF. Upon this operation of the main switch control element, the objective is retracted from its position ready for photographing into a retracted, home position, the protective barrier is closed, and the display is de-energized. The camera thus made inoperative is put in the camera case to carry or place in storage.

However, such conventional camera is arranged so that the camera is switched between the state ready for photographing and the inoperative state by operating the main ON-OFF switch through manual actuation of the control element. Such arrangement results in various problems, as will be described.

Such conventional camera has been developed with the intention of assuring that everyone can enjoy photographing. Therefore, it is required that even inexperienced users can easily handle operation of the camera. However, so far as such inexperienced user is concerned, there is always a possibility that the user might fail to operate the main switch control element and carry or store the camera with the main switch remaining turned ON. If the main switch remains turned ON, the camera remains in its state ready for photographing. Namely, the capacitor in the strobe circuit continues to be charged, the automatic exposure metering function remains actuated, and the display continues to display various information. Such carelessness may result in excessive consumption of the built-in source battery with the result that the camera may be unavailable for use.

Another difficulty with such conventional camera is that in using the camera, the user might fail to operate the main switch control element and depress the release button with the main switch remaining turned OFF. Obviously, photographing is impossible and the user may pass up a fleeting opportunity to capture a desired image in a photograph.

SUMMARY OF THE INVENTION

In view of the problems encountered by the conventional camera of this type and in view of a fact that during periods of non-use the camera is usually stored in the camera case, the present invention provides a photographic camera having an automatic preparation function that prevents useless consumption of the source battery, as usually occurs for a period of time during which the camera is stored away, and said camera can be automatically made ready for photographing as the camera is taken out from the camera case to take a picture.

According to an aspect of the invention, a photographing camera is provided with an automatic preparation function including a built-in control for performing various control functions, such as automatic exposure metering, autofocusing, and automatic film transport, and a photo cell provided on an exterior surface of said camera at an appropriate position. An electromotive force generated by said photo cell energizes said control and thereby makes the camera ready for photographing and if no electromotive force is generated by said photo cell within a predetermined period, said control is de-energized and the camera is placed in a storage mode.

Specifically, when the camera is removed from a camera case to take a picture, said photo cell is responsive to ambient light to generate an electromotive force which causes, in turn, said control to be energized. Energization of the control actuates a main switch ON and respective motors are actuated to open a protective barrier for an objective and to extend the objective from its retracted position to its position for photographing. At the same time, a main capacitor in a strobe circuit begins to be charged in preparation for discharge of a strobe flash. Upon depression of a release button, the shutter is released under exposure control of said automatic exposure metering function and autofocusing by said autofocusing function.

No electromotive force is generated by said photo cell so far as the camera is not used and hidden away in the camera case or stored in the dark. A predetermined period after the photo cell has ceased to generate the electromotive force, the main switch is turned OFF, the protective barrier is closed, the objective is retracted into its home position, and said CPU is de-energized.

According to another aspect of the invention, if no operation of the shutter release button occurs within a predetermined period after the camera has been made ready for photographing, the camera is automatically made not ready for photographing. Consumption of the source battery is thereby further reduced. If no change occurs in an ambient luminance and no shutter release occurs within a predetermined period after the camera has been made ready for photographing, the camera is automatically made not ready for photographing.

According to yet another aspect of the invention, the shutter release button may be operated from a state of the camera being in a storage mode, not ready for photographing, to energize the control and thereby make the camera ready for photographing. In this manner, missed opportunities to capture a fleeting image are reliably avoided because the camera can be made ready for photographing merely by operating the shutter release button without previous manual operation of the main switch.

Preferably, said photo cell is provided on a top surface of the camera body and said photo cell is provided in the form of a solar cell. Preferably, there is further an accumulator adapted to accumulate the electromotive force generated by said photo cell.

DETAILED DESCRIPTION OF THE PREFERRED EMBODIMENT

The photographic camera provided with an automatic preparation function, according to the invention, will be more specifically described in connection with an embodiment illustrated in the accompanying drawing.

Figure 2:
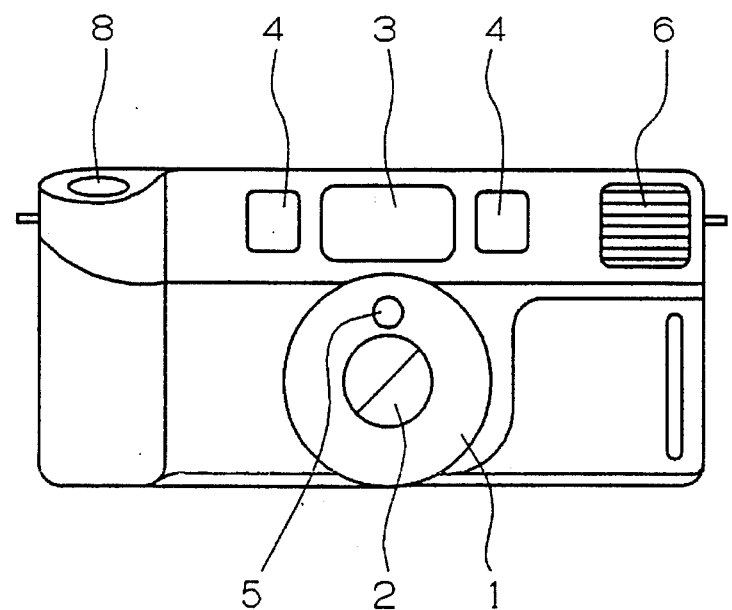
FIG. 2 is a front elevation of the camera in FIG. 1.

FIG. 2 is a front view showing the camera provided with the automatic preparation function in a mode in which the camera is in a storage mode, not ready for photographing. A camera body is centrally provided on its front side with a lens barrel 1 holding an objective (not shown), and this lens barrel 1 is, in turn, provided on its front side with a protective barrier 2 normally closed to protect the objective. With this protective barrier 2 being open to expose the objective, the camera is made ready for photographing. Above the lens barrel 1, there is provided an objective window 3 of a viewfinder and, on either side of this objective window 3, there are provided range finder windows 4 behind which respective automatic focusing (AF) sensors (not shown) are situated. The lens barrel 1 is provided on its front side with an automatic exposure (AE) sensor 5 to determine a luminance of the object to be photographed. The camera body further includes a strobe flash window 6 on its front side adjacent one extremity thereof.

Figure 1:
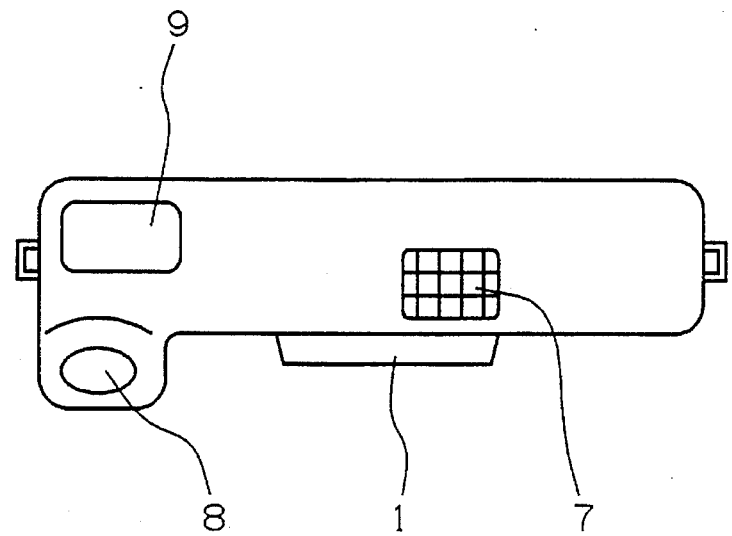
FIG. 1 is a top plan view showing an embodiment of a photographic camera provided with an automatic preparation function, according to the invention.

FIG. 1 is a front view of this camera and shows a photo cell in the form of a solar cell 7 provided on a top side of the camera body at an appropriate position above the lens barrel 1. There are provided on the top side, in addition to said solar cell 7, a release button 8 and a liquid crystal display 9 adjacent one extremity thereof.

Figure 3:
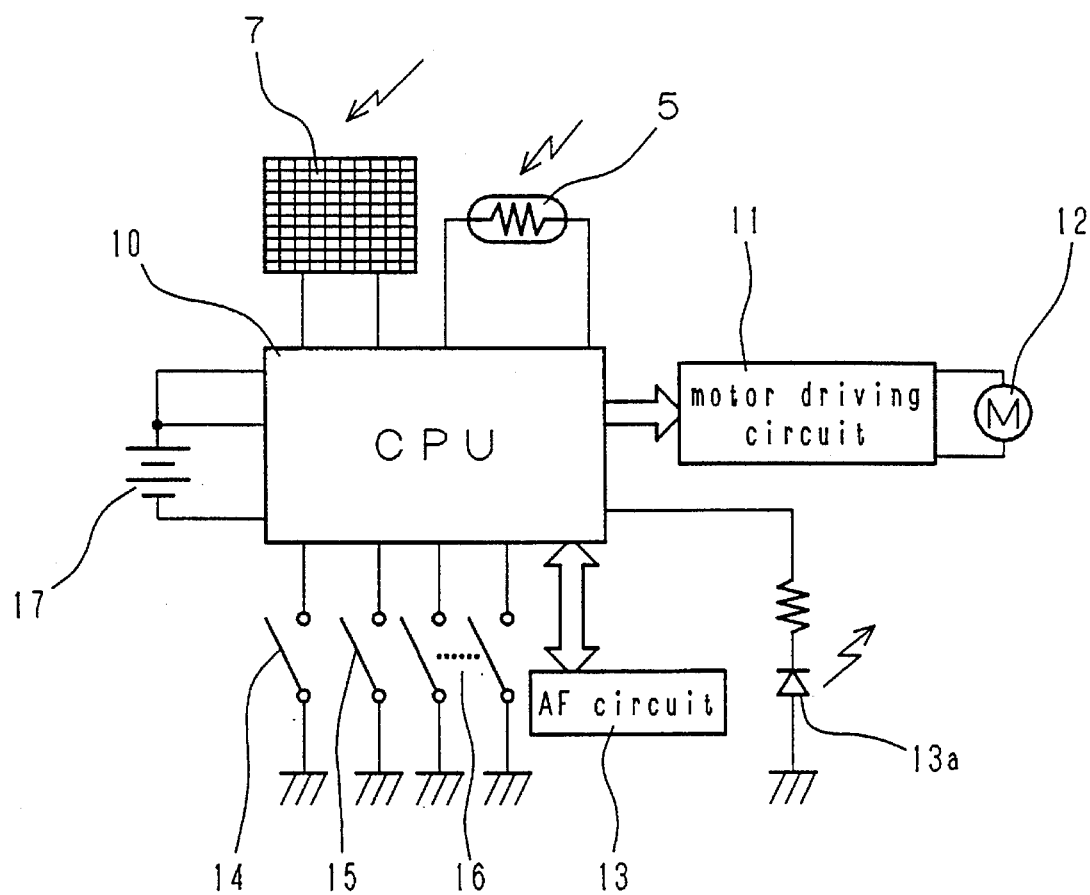
FIG. 3 is a schematic block diagram illustrating a circuit arrangement for the camera provided with an automatic preparation function, according to the invention.

FIG. 3 is a schematic block diagram illustrating an electric circuit of the photographic camera provided with an automatic preparation function, according to the invention, and, as illustrated, the electric circuit is arranged around a microcontroller, such as a CPU 10. Terminals of said solar cell 7 are connected to the CPU 10, so that an electromotive force generated by said solar cell 7 is input to the CPU 10. An output signal from said AE sensor 5 is input to the CPU 10, which computes an exposure time on the basis of the photometric data obtained by said AE sensor 5 with respect to a luminance of an object to be photographed (AE computation). The CPU 10 applies to motor driving circuit 11 a motor driving signal. Motor 12 serves various functions, such as film transport, movement of the objective, and opening and closing of the protective barrier. Range data of the object to be photographed is exchanged between the CPU 10 and an autofocusing circuit (AF circuit) 13, so that this AF circuit 13 may cause the shutter to be released in a state of the objective well focused on the object to be photographed. Referring to FIG. 3, a reference numeral 13a designates a projector element adapted to project a beam of light which will be received by a photo detector element of the AF circuit 13.

A first-half stage release switch 14 and a second-half stage release switch 15 are connected to the CPU 10 both adapted to be turned ON upon depression of said release button 8. More specifically, the first-half stage release switch 14 is adapted to be turned ON upon partial depression of the release button 8 and the second-half stage release switch 15 is adapted to be turned ON upon further depression of the release button 8. Turning ON of the first-half release stage switch 14 initiates said AE sensor 5 to determine a luminance of the object and to compute an exposure time. Simultaneously, the beam of light projected from said projector element 13a onto the object and reflected thereon is received by the photo detector in the AF circuit 13, which determines, based on this received beam of light, a distance to the object. Then the shutter is released upon turning ON of the second-half stage release switch 15.

In addition to the above-mentioned switches 14, 15, various switches designated in general by a reference numeral 16 are connected to the CPU 10. These switches 16 include a self switch for self-timer photographing, a forcible rewinding switch for rewinding a film roll before usages of all frames, a photographing mode switch for changeover between standard photographing and panoramic photographing, and a forcible flash discharge switch for forcibly discharging a strobe flash under certain situations; for example, in photographing against the light. These various switches 16 are operatively associated with respective control elements provided on the camera body at appropriate locations so as to be selectively operated and thereby to turn the associated switches ON or OFF.

A source battery 17 for driving the various components is also connected to the CPU 10. Additionally, the CPU 10 includes an accumulator (not shown) connected to said source battery 17 so that the electromotive force generated by said solar cell 7 may charge this accumulator.

Figure 4:
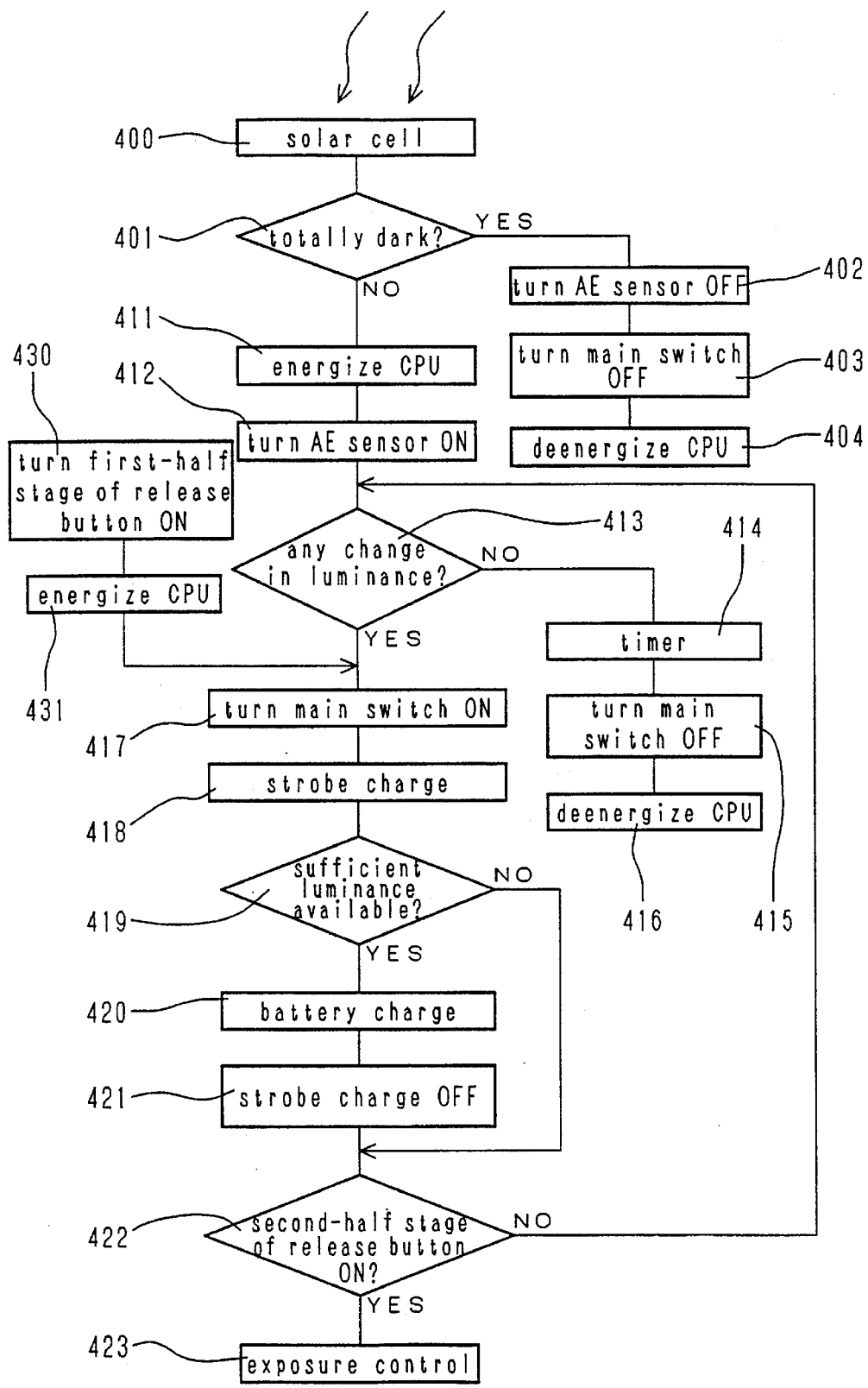
FIG. 4 is a flowchart illustrating an automatic preparation function, according to the invention.

Operation of the camera provided with the automatic preparation function constructed according to the invention, as has been described hereinabove, will be described in reference with a flowchart of FIG. 4.

It is now assumed that the camera is unused and stored away in a camera case. Under such condition, no light is incident on said solar cell 7 and, therefore, no electromotive force is generated thereby, since the camera is kept in the dark. Referring to the flowchart, step 401 detects dead darkness, then the AF sensor 5 serving to pick up the object luminance data necessary of AF computation is turned OFF (step 402) and a main switch used to energize the CPU 10 is turned OFF (step 403). Assuming that the camera is put back or stored away in the camera case immediately after it has been used, turning OFF of said main switch causes the objective to be retracted from its position for photographing to its non-use position and simultaneously causes the protective barrier to be closed, making the camera not ready for photographing. At the same time, the CPU 10 is de-energized (step 404). In this manner, consumption of the source battery 17 is minimized.

When the camera is removed from the camera case, ambient light is incident on the solar cell 7 and an electromotive force is generated thereby. Accordingly, conclusion in the step 401 is NO and the routine proceeds to step 411 which energizes the CPU 10. The routine proceeds to step 412, which turns the AE sensor 5 ON, and then proceeds to step 413, which determines whether there has occurred any change in the luminance on the basis of new luminance data picked up by the AE sensor 5. If the conclusion is NO, the routine proceeds to step 414 and, after a predetermined time has elapsed, the main switch is turned OFF (step 415) in order to practically correspond to the case in which the camera is taken out again from the camera case to load it with a new film roll rather than to use it immediately for photographing.

If the conclusion of said step 413 is YES; i.e., a change in luminance is determined, the routine proceeds to step 417 to turn the main switch ON, since such change in luminance suggests that the camera will be used immediately for photographing. When the main switch is turned ON, the protective barrier for the objective is opened, the objective which has been retracted to its non-use position is extended forward to its position ready for photographing, and, if the camera has a bifocal lens or a zooming mechanism, its variable focus lens system assumes a position of standing by. Then, a main capacitor in a strobe circuit is charged (step 418) so that a strobe flash photograph may be taken, if necessary. Then, it is determined on the basis of the luminance data picked up by the AE sensor 5 whether sufficient luminance is available or not (step 419) and, if the luminance is determined to be insufficient, the routine proceeds to step 422. If the step 419 determines that a sufficient luminance is available, the routine proceeds to step 420. Then, the electromotive force generated by the solar cell 7 charges the accumulator (not shown) and charging of the main capacitor in the strobe circuit is stopped (step 421). Thereafter, the routine proceeds to step 422.

The step 422 determines whether the second-half stage release switch 15 is turned ON or not. The second-half stage release switch 15 is in directly operative association with the shutter release and the shutter is released when the second-half stage release switch 15 is turned ON. Accordingly, if conclusion of the step 422 is YES, the routine proceeds to step 423 to carry out an exposure control followed by taking a photograph. If the step 422 determines that the second-half stage release switch 15 is not turned ON, the routine returns to said step 413 and the above-mentioned steps are repeated.

When it is desired to make the camera having the main switch turned OFF (steps 403, 415) ready for photographing, the release button 8 may be slightly depressed so as to turn the first-half stage release switch 14 ON. As indicated by the flowchart of FIG. 4, after the first-half stage release switch 14 has been turned ON (step 430), and thereby the CPU 10 has been energized (step 431), the routine may be interrupted by the step 417 to turn the main switch ON and thereby to make the camera ready for photographing. Specifically, the protective barrier is opened and the objective is extended forward to its position for photographing. Thereupon, the camera is ready for depression of the second-half stage release switch 15.

EFFECT OF THE INVENTION

As will be readily understood from the foregoing description, with the photographic camera having the automatic preparation function according to the invention, no electromotive force is generated by the solar cell and, therefore, the CPU is not energized so far as the camera remains stored away in the camera case or laid in the dark, since an electromotive force is generated by the solar cell provided on the outer side of the camera body and thereby the CPU is energized only when the ambient light is incident on the solar cell. In consequence, the main capacitor in the strobe circuit is not charged further and the automatic exposure metering function and the liquid crystal display are not actuated. Consumption of the built-in source battery is thereby minimized.

The main switch is automatically turned OFF as the camera is stored in the camera case, so it is unnecessary to operate the control dement of the main switch and failure to turn off the main switch is avoided. In this manner, the source battery is protected from careless consumption even if the user is inexperienced in handling of the camera.

The CPU is automatically energized to make the camera ready for photographing as the solar cell generates an electromotive force, so the camera can be made ready for photographing without any manual operation of the main switch control element by the user and the possibility that the user might inadvertently pass up an opportunity to capture a fleeting image is minimized.

Placement of the photo cell in the form of said solar cell on the top surface of the camera body allows the ambient light to be efficiently received by the photo cell. Accordingly, an electromotive force substantially corresponding to the ambient luminance is generated by said photo cell and thereby the automatic preparation function is reliably actuated.

The embodiments of the invention in which an exclusive property or privilege is claimed are defined as follows:

1. A photographic camera having an automatic preparation function said camera, comprising:

a photo cell provided on the outer surface of said camera for generating an electromotive force when said photo cell is exposed to illumination; and control means coupled to said photo cell for receiving an energizing signal therefrom, for making the camera ready for photographing in response to receipt of the energizing signal, and for making the camera not ready for photographing a predetermined time period after the energizing signal is no longer received from said photo cell.

2. The photographic camera having an automatic preparation function according to claim 1, wherein said control means is energized by the electromotive force generated by said photo cell and turns a main switch ON when energized by said photo cell to thereby make the camera ready for photographing, wherein, if said photo cell does not generate an electromotive force within a predetermined period, said control means is de-energized and turns the main switch OFF to thereby make the camera not ready for photographing.

3. The photographic camera having an automatic preparation function according to claim 1, wherein said control means makes the camera not ready for photographing if said control means does not detect a shutter release operation within a predetermined period after the camera has been made ready for photographing.

4. The photographic camera having an automatic preparation function according to claim 1, wherein said control means automatically makes the camera not ready for photographing if said control means determines that neither a change in an ambient luminance nor a shutter release operation has occurred within a predetermined period after the camera has been made ready for photographing.

5. The photographic camera having an automatic preparation function according to claim 1 and further including a release button operable when the camera is not ready for photographing to energize said control means to thereby make the camera ready for photographing.

6. The photographic camera having an automatic preparation function according to claim 1, wherein said photo cell is provided on a top surface of the camera body.

7. The photographic camera having an automatic preparation function according to claim 1, wherein said photo cell is provided in the form of a solar cell.

8. The photographic camera having an automatic preparation function according to claim 1 further including an accumulator adapted to accumulate the electromotive force generated by said photo cell.

9. The photographic camera having an automatic preparation function according to claim 2, wherein said control means makes the camera not ready for photographing if said control means does not detect a shutter release operation occurs within a predetermined period after the camera has been made ready for photographing.

10. The photographic camera having an automatic preparation function according to claim 2, wherein said control means automatically makes the camera not ready for photographing if said control mens determines that neither a change in an ambient luminance nor a shutter release operation has occurred within a predetermined period after the camera has been made ready for photographing.

11. The photographic camera having an automatic preparation function according to claim 2 and further including a release button operable when the camera is not ready for photographing to energize said control means to thereby make the camera ready for photographing.

12. The photographic camera having an automatic preparation function according to claim 2, wherein said photo cell is provided on a top surface of the camera body.

13. The photographic camera having an automatic preparation function according to claim 2, wherein said photo cell is provided in the form of a solar cell.

14. The photographic camera having an automatic preparation function according to claim 2 further including an accumulator adapted to accumulate the electromotive force generated by said photo cell.

15. The photographic camera having an automatic preparation function according to claim 3 and further including a release button operable when the camera is not ready for photographing to energize said control means to thereby make the camera ready for photographing.

16. The photographic camera having an automatic preparation function according to claim 3, wherein said photo cell is provided on a top surface of the camera body.

17. The photographic camera having an automatic preparation function according to claim 3, wherein said photo cell is provided in the form of a solar cell.

18. The photographic camera having an automatic preparation function according to claim 3 further including an accumulator adapted to accumulate the electromotive force generated by said photo cell.

19. The photographic camera having an automatic preparation function according to claim 4 and further including a release button operable when the camera is not ready for photographing to energize said control means to thereby to make the camera ready for photographing.

20. The photographic camera having an automatic preparation function according to claim 4, wherein said photo cell is provided on a top surface of the camera body.

21. The photographic camera having an automatic preparation function according to claim 4, wherein said photo cell is provided in the form of a solar cell.

22. The photographic camera having an automatic preparation function according to claim 4 further including an accumulator adapted to accumulate the electromotive force generated by said photo cell.

23. The photographic camera having an automatic preparation function according to claim 5, wherein said photo cell is provided on a top surface of the camera body.

24. The photographic camera having an automatic preparation function according to claim 5, wherein said photo cell is provided in the form of a solar cell.

25. The photographic camera having an automatic preparation function according to claim 5 further including an accumulator adapted to accumulate the electromotive force generated by said photo cell.

26. The photographic camera having an automatic preparation function according to claim 6, wherein said photo cell is provided in the form of a solar cell.

27. The photographic camera having an automatic preparation function according to claim 6 further including an accumulator adapted to accumulate the electromotive force generated by said photo cell.

28. The photographic camera having an automatic preparation function according to claim 7 further including an accumulator adapted to accumulate the electromotive force generated by said photo cell.

29. The photographic camera as defined in claim 1, wherein said control means controls various/functions of the camera including an automatic exposure metering function, an autofocusing function, and an automatic film transport function.

30. The photographic camera as defined in claim 1 and further including lens protecting means coupled to said control means for automatically covering the camera lens when said control means makes the camera not ready for photographing and for automatically retracting to expose the camera lens when said control means makes the camera ready for photographing.

* * * * *

UNITED STATES PATENT AND TRADEMARK OFFICE
CERTIFICATE OF CORRECTION

PATENT NO. : 5,519,468
DATED : May 21, 1996
INVENTOR(S) : Katsuhiro Ohtake

It is certified that error appears in the above-indentified patent and that said Letters Patent is hereby corrected as shown below:

Column 2, line 5;
"dement" should be --element--.

Column 6, line 33;
"dement" should be --element--.

Column 7, claim 9, line 41;
Delete "occurs"

Column 7, claim 10, line 46;
"mens" should be --means--.

Column 8, claim 19, line 18;
Delete "to" second occurrence

Signed and Sealed this

Fifteenth Day of October, 1996

Attest:

BRUCE LEHMAN

*Attesting Officer*  *Commissioner of Patents and Trademarks*